March 24, 1953      R. L. LOOMIS      2,632,591
FOLDING PLATFORM AND STEP
Filed Nov. 1, 1950      3 Sheets-Sheet 1
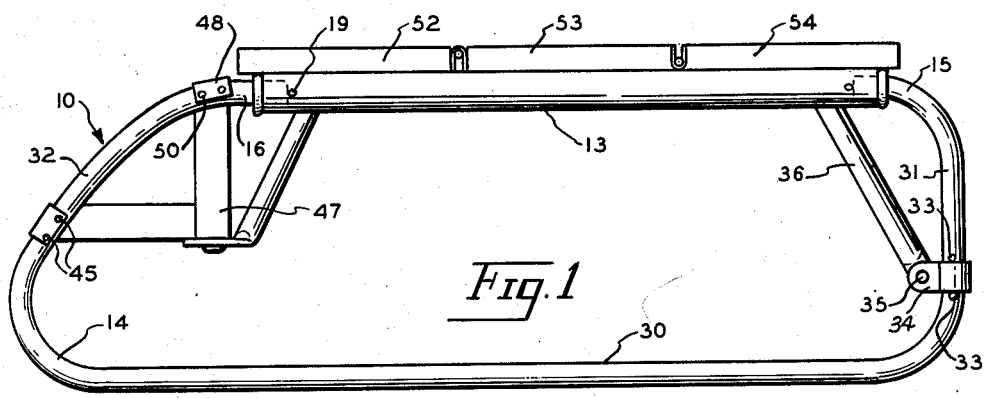
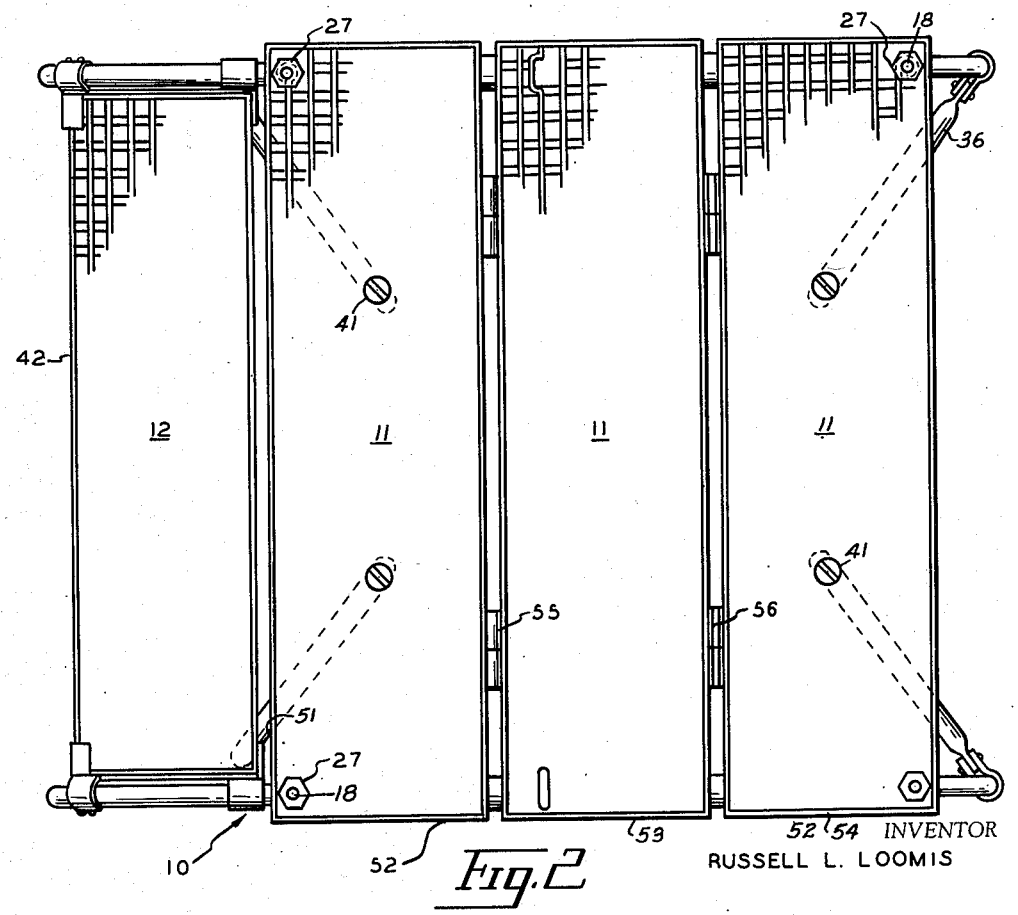
INVENTOR
RUSSELL L. LOOMIS
BY *Gustave Miller*
ATTORNEY March 24, 1953  R. L. LOOMIS  2,632,591
FOLDING PLATFORM AND STEP
Filed Nov. 1, 1950  3 Sheets-Sheet 2

INVENTOR
RUSSELL L. LOOMIS
BY Gustav Miller
ATTORNEY

March 24, 1953 R. L. LOOMIS 2,632,591
FOLDING PLATFORM AND STEP
Filed Nov. 1, 1950 3 Sheets-Sheet 3
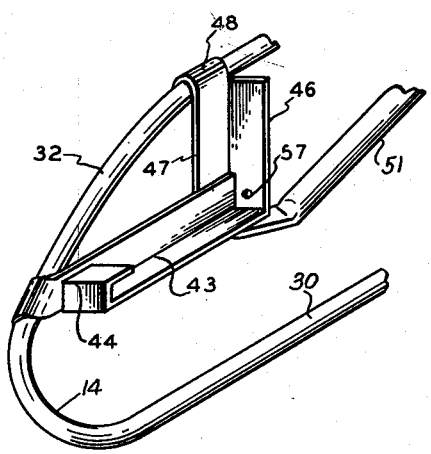
Fig.5
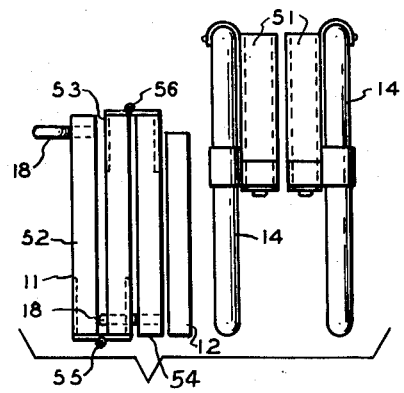
Fig.6
Fig.7
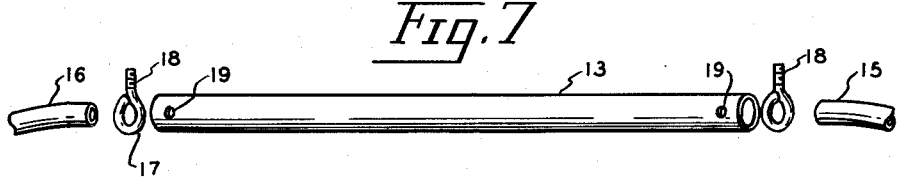
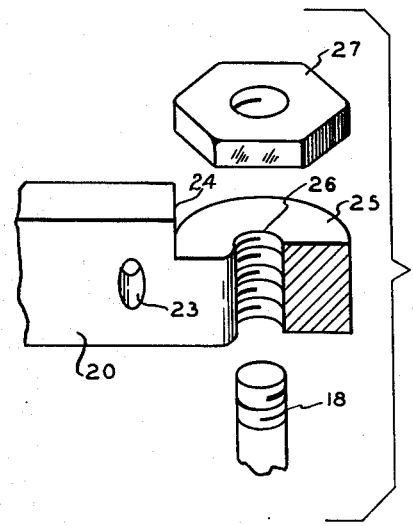
Fig.8
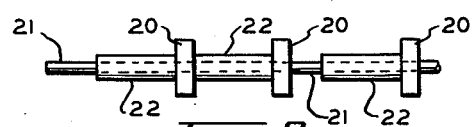
Fig.9
INVENTOR
RUSSELL L. LOOMIS
BY Gustave Miller
ATTORNEY Patented Mar. 24, 1953

2,632,591

UNITED STATES PATENT OFFICE 2,632,591

FOLDING PLATFORM AND STEP

Russell L. Loomis, Pasadena, Tex.

Application November 1, 1950, Serial No. 193,500

5 Claims. (Cl. 228—36)

This invention relates to a shoe cleaning folding platform and step, and has for an object to provide a folding platform and step particularly intended for use in connection with trailer coaches of the type generally used in trailer parks when stopping in such trailer parks for a somewhat extended stay. Such trailer coaches are usually provided with a more or less flimsy step outside their entrances intended for use for overnight stops but usually found to wear out quickly and to be too flimsy for use when the trailer coach is parked in a trailer park for several months at a time. Although particularly intended for use in such trailer coaches, it is obviously likewise usable wherever a step and platform may be desirable, such as at summer cottages, cabins, or the like.

A further object of this invention is to provide a folding platform and step wherein the surface is made in the form of a grating serving for cleaning one's shoes or boots as one walks thereover, the grating being of a novel type that is inexpensive to manufacture.

A further object of this invention is to provide an improved folding platform and step which may be quickly disassembled and folded down to a very compact package and occupy a small amount of space, less than that of a conventional piece of luggage, and be stored on the trailer when not in use, as when traveling.

A further object of this invention is to provide a readily foldable platform and step which can be set up into operative position or taken down or disassembled into two unitary parts occupying a minimum amount of storage space.

Yet, a further object of this invention is to provide a folding platform and step which may be made in various sizes and is intended to be laid on the ground or other surface in front of the trailer door when the trailer is parked for extended periods, thus eliminating the necessity of the trailer owner building a separate porch or veranda or attempting to remedy the defect of the usual conventional trailer step by providing concrete blocks or other unsightly or expensive substitutes. Inasmuch as the folding platform and step of this invention is not to be in any way attached to the trailer coach itself, it can obviously be used with any type of trailer coach, and, if desired, may have a length of chain locking it against theft by attaching a chain and lock from the trailer to one of the foldable platform supports.

With the foregoing and other objects in view, as will hereinafter become apparent, this invention comprises the combinations, constructions, and arrangement of parts hereinafter set forth, disclosed, claimed and illustrated in the accompanying drawings, wherein:

Fig. 1 is a side plan view of the foldable platform and step of this invention;

Fig. 2 is a top plan view of Fig. 1;

Fig. 5 is a perspective detailed view of the step grating support;

Fig. 6 shows the folded platform and step in position ready for storage;

Fig. 7 is a fragmentary exploded view of the frame tubing and grating attaching eyes;

Fig. 8 is a perspective exploded view showing how the eyebolts are attached to the grating; and Fig. 9 is a partly exploded detailed view of one end of the platform and step grating.

Figure 3:
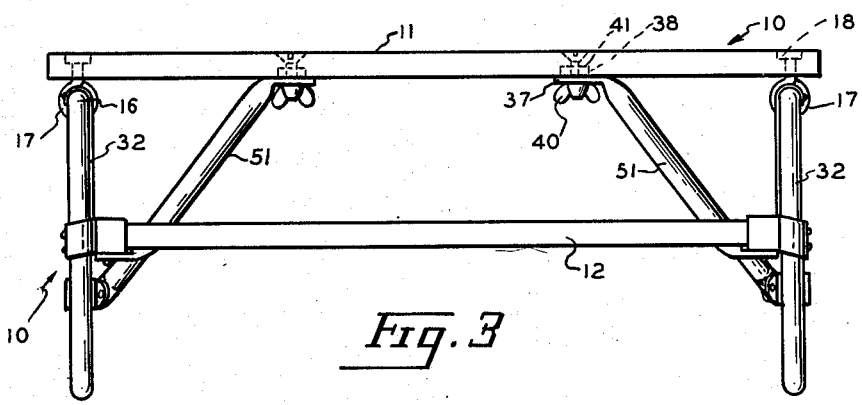
Fig. 3 is a front end view.
Figure 4:
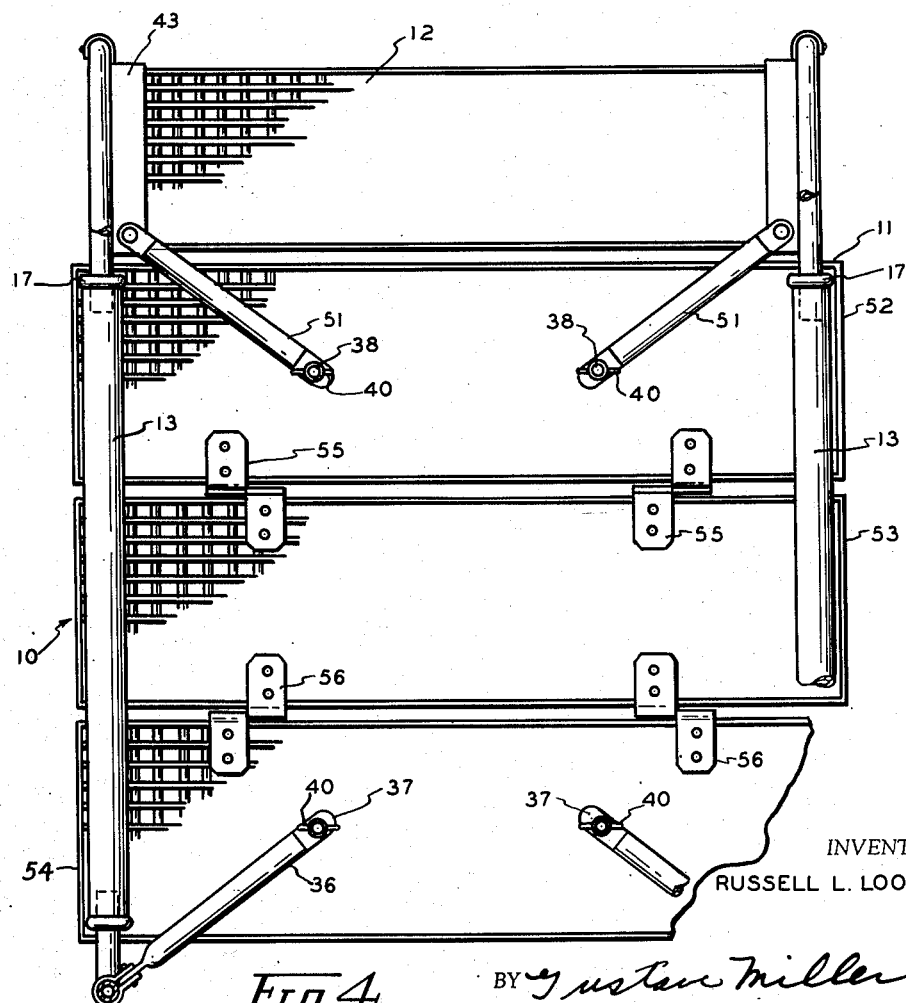
Fig. 4 is a bottom plan view, partly broken away.

There is shown at 10 the foldable platform and step of this invention as a complete unit in itself, which may be laid in front of the entrance door of a trailer coach or used wherever else it may be desirable to provide a two-step approach between two different elevations.

This unit 10 includes an upper platform 11 and a lower step 12. The platform 11 is supported at its opposite ends by means of structural members, here shown as tubes 13. The tubes 13 are in turn supported by structural members, here shown as consisting of bow-shaped tubes 14, having inturned ends 15 and 16 spaced apart from each other a distance somewhat less than the length of the tube 13, so that the ends 15 and 16 may be sprung apart sufficiently so that they may enter the opposite ends of the tube 13 after first passing through the eyes 17 of eye-bolt 18, which eye-bolt 18 is in turn secured to the bottom of a corner edge of the platform 11. The platform 11 and the step 12, as well, is made up of a number of grating bars 20 held in spaced apart parallel relationship to each other by means of transverse rods or bolts 21 and spacing tubes 22, the rods or bolts 21 passing through transverse apertures 23. In order to secure the eyebolts 18 to the platform 11, the two end grating bars of platform 11 may have each of their ends recessed as at 24 and then formed into a curl 25, having an aperture 26 through which the shank of the eye-bolt 18 is inserted and held by means of a nut 27 seated within the recessed end 24.

As shown, the bowed-tube 14 includes a foot section 30 intended to rest on the ground or other surface, which at the rear end merges into an upright leg portion 31, which, in turn, merges to its rear end 15. At the other end of the foot portion 30, the bowed tube 14 merges by a smooth curve into an upwardly but rearwardly angular front leg 32 which, in turn, merges into the front end 16. Pivotally secured about each rear leg 31, between upper and lower stops 33, is a clip 34 on which is pivoted at 35 a brace 36 whose other end is flat at 37 and apertured for being detachably secured to a bolt 38 by means of wing-nut 40 at the bottom of the platform 11. The head 41 of the bolt 38 is countersunk within the platform 11 and the shank of the bolt 38 may be supported in the platform 11 by means of a suitably located eye welded or otherwise secured to a grating bar 20 in the proper location.

The step 12 has its grating supporting bolts or rods 21 suitably mounted within a rectangular framework 42.

In order to removably support the step 12 on the front angular legs 32, each angular leg 32 is provided with an angle bar 43 having the forward portion of the horizontal part of angle bar 43 formed to a reverse hook 44 and the forward portion of the upright part of angle bar 43 is folded about the leg 32 and riveted or otherwise secured thereto at 45. At its rear end the angle bar 43 has its upright portion cut to the angle so that the horizontal portion may be folded upwardly at 46 and the other leg 47 may have its end 48 folded over the upper part of angular leg 32 and riveted or otherwise secured thereto, as at 50. The length of the angle bar 43 between its front hook 44 and its rear upright 46 is just sufficient to snugly receive one end of frame 42 of platform 12. Pivoted to the bottom of angle bar 43 adjacent its rear end is a brace 51 whose other end is detachably secured to the bottom of platform 11 by a wing nut 40 and bolt 38 identical with the bolt and nut that secures brace 36 at the rear end of the platform. The brace 51 provides the same function at the front of the platform that is provided by the brace 36 at the rear end of the platform.

While the platform 11 may be made of gratings enclosed within a single frame in the same manner as the step 12 is made of gratings enclosed within a single frame 42, and will be made so in a small size platform, it is preferred to make it in a larger size platform in a multiplicity of sections, here shown as three sections 52, 53 and 54, each within its own frame and secured together by hinges 55 and 56 having their pivot ends so arranged that the three platform sections may fold together as shown in Fig. 6, when the platform has been removed for storage purposes.

In operation, the foldable platform and step of this invention is assembled into useable condition by unfolding the platform sections 52, 53 and 54 in upside down condition on the ground, placing the tubes 13 between the eyes 17, then taking the bow-shaped tubes 14, inserting one of its ends as 15 to the eye 17 at the rear of the platform 11, and then springing the other end 16 until it can be inserted through the other eye 17 into the other end of tube 13. Stops 19, consisting of indentations in the sides of the tube 13 or of bolts or screws therethrough, are provided adjacent each end of the tubes 13 to limit the amount that the tube ends 15 and 16 may enter therein. The brace 36 is then pivoted at its point 35 in clip 34 and then swung around until its end can be secured to the bottom of the platform 11 by means of bolt 38 and wing nut 40. Then, the front step 12 has its frame 42 inserted beneath the hooks 44 and pressed into the angle irons 43, after which the front braces 51 are pivoted to the appropriate position for securing their ends to the bottom of platform 11, by means of wing nuts 38. The step 12 will normally remain in position on the angle iron 43 after the front braces 51 are in position, but if desired set screws or studs may be inserted through suitable apertures 57 in the angle iron rear upright 46 for locking the step frame 42 in position, against accidental removal. To insure against theft of the assembled platform and step, a chain may be passed around the rear leg portion 31 and attached and locked to any convenient portion of the trailer with which it is being used.

To disassemble the platform and step for storage, as when the trailer is traveling, it is only necessary to turn the platform and step upside down, remove the four wing nuts 40 and also, if used, the set screw or stud screw through the apertures 57 permitting the platform sections and step sections to be removed from the bows 14 by merely springing the ends of the bows 14 apart, thus releasing the tube 13 and the platform 11, whereupon the platform 11 may be folded about its hinges to the position shown in Fig. 6. The step 12 may be removed and the braces 36 and 51 pivoted to a position parallel with the plane of the bow 14, and the four parts, the folded platform 11, the step 12, and the bow 14 and tube 13 placed together in a neat package like arrangement, as shown in Fig. 6 for storage in a luggage compartment or under a bed in the trailer until it is again needed, whereupon it may be readily reassembled as described.

While the foldable platform and step, as thus described, may be made entirely of metal, it is apparent that some parts may be made of other material, such as wood or plastic, or the like. The grating bars, for instance, could well be of wood or plastic, and when of metal the entire device will preferably be of a light metal which has sufficient structural strength for the purpose. Also, while the tubes or structural parts have been shown and described as being of circular cross-section, they may be of any other suitable cross-section, so long as their ends are of a shape to cooperate with each other where necessary. Also, when the platform 11 is made of only a single section, the front brace 36 and rear brace 51 at one end may be secured to the platform by a single bolt 38, the pair of braces at the other end of the platform being similarly secured by a single bolt.

While the device has been shown and the structure described in detail, it is obvious that this invention is not to be considered as limited to the exact form disclosed, and that changes in detail and construction may be made therein within the scope of what is claimed, without departing from the spirit of this invention.

Having thus set forth and disclosed the nature of this invention, what is claimed is:

1. In a foldable platform and step, a platform and a supporting means for each end of the platform, each supporting means comprising a bowed structural member, said bowed structural member having upwardly extending inturned ends, eye means on the bottom of said platform through which said inturned bowed ends extend, brace means pivotally secured to the upturned portions of said bowed structural member having their free ends arranged to be detachably secured to the bottom of said platform at points spaced inwardly from their sides, the front upright portion of each bowed member extending at a rearward angle, an angle step platform securing member secured to said rearwardly extending front upright portion at an intermediate point and at an upper point thereon, and a step platform arranged to be detachably secured between said angle members, said angle members providing a pivoting means for said front brace members.

2. A folding step and platform comprising a rcetangular platform, and a readily detachable structural supporting means at two opposite sides of said rectangular platform, said supporting means comprising a bowed structural member having a horizontal foot portion merging at its rear to an upwardly extending leg portion merging at its top to a forwardly extending end, said bowed structural member merging at the forward end of said foot portion into an upwardly and rearwardly extending front leg portion merging into a rearwardly extending end in the same plane with said forwardly extending end of said rear leg portion, said ends being spaced apart a distance slightly less than the front to rear length of said rectangular platform, means on said platform spaced apart a distance at least equal to the distance between said ends and arranged to cooperatively receive said ends, and brace means pivotally supported from said upwardly extending legs of said structural member having their free ends arranged to be detachably secured to said rectangular platform at a point spaced inwardly from its sides, an angle member secured to each rearwardly extending forward leg at an intermediate point and at an upper point thereon and a platform step arranged to be detachably supported on said angle member.

3. A folding step and platform comprising a rectangular platform, and a readily detachable structural supporting means at two opposite sides of said rectangular platform, said supporting means comprising a bowed structural member having a horizontal foot portion merging at its rear to an upwardly extending leg portion merging at its top to a forwardly extending end, said bowed structural member merging at the forward end of said foot portion into an upwardly and rearwardly extending front leg portion merging into a rearwardly extending end in the same plane with said forwardly extending end of said rear leg portion, said ends being spaced apart a distance slightly less than the front to rear length of said rectangular platform, means on said platform spaced apart a distance at least equal to the distance between said ends and arranged to cooperatively receive said ends, and brace means pivotally supported from said upwardly extending legs of said structural member having their free ends arranged to be detachably secured to said rectangular platform at a point spaced inwardly from its sides, said rectangular platform comprising a plurality of individual rectangular sections hingedly secured together and extending transversely between said structural supporting members and a longitudinal structural member arranged to be detachably secured between said inturned ends of said bowed structural member and extend beneath said platform sections to support the same.

4. A folding step and platform comprising a pair of bowed structural tubes, each tube including a horizontal foot portion merging at its rear end into an upwardly extending leg portion, in turn merging into a forwardly extending end, said foot portion merging at its forward end into a rearwardly extending angular leg portion, merging in turn into a rearwardly extending end in the same plane with said forwardly extending rear end, a step supporting angle iron secured to said forward leg adjacent its end and at an intermediate point thereon, a brace member pivotally secured to said angle iron, a second brace member pivotally secured to said rear upright leg, a rectangular platform, and eye means adjacent each corner edge of said platform, the eye means on each side being spaced apart a distance less than the distance between said tube ends and arranged to receive said tube ends therethrough.

5. A folding step and platform comprising a pair of bowed structural tubes, each tube including a horizontal foot portion merging at its rear end into an upwardly extending leg portion, in turn merging into a forwardly extending end, said foot portion merging at its forward end into a rearwardly extending angular leg portion, merging in turn into a rearwardly extending end in the same plane with said forwardly extending rear end, a step supporting angle iron secured to said forward leg adjacent its end and at an intermediate point thereon, a brace member pivotally secured to said angle iron, a second brace member pivotally secured to said rear upright leg, a rectangular platform, and eye means adjacent each corner edge of said platform, the eye means on each side being spaced apart a distance less than the distance between said tube ends and arranged to receive said tube ends therethrough, and a step arranged to be detachably supported on said angle irons.

RUSSELL L. LOOMIS.

REFERENCES CITED

The following references are of record in the file of this patent:

UNITED STATES PATENTS

| Number | Name | Date |
| --- | --- | --- |
| 377,478 | Bement | Feb. 7, 1888 |
| 789,338 | Shortall | May 9, 1905 |
| 1,726,144 | Everts | Aug. 27, 1929 |
| 2,176,551 | Solem | Oct. 17, 1939 |
| 2,222,070 | Graves | Nov. 19, 1940 |
| 2,410,330 | Ashenfelter | Oct. 29, 1946 |

FOREIGN PATENTS

| Number | Country | Date |
| --- | --- | --- |
| 506,200 | France | May 25, 1920 |
| 596,374 | France | Aug. 8, 1925 |
| 588,594 | Great Britain | May 28, 1947 |